(12) United States Patent
Wojewnik

(10) Patent No.: US 6,966,594 B2
(45) Date of Patent: Nov. 22, 2005

(54) VEHICLE TRIM PANEL AND METHOD OF REDUCING BSR

(75) Inventor: Albert Wojewnik, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 8 days.

(21) Appl. No.: 10/708,411

(22) Filed: Mar. 1, 2004

(65) Prior Publication Data
US 2005/0189779 A1 Sep. 1, 2005

(51) Int. Cl.[7] .............................................. B60R 7/02
(52) U.S. Cl. ................... 296/39.3; 181/284; 181/294; 181/296
(58) Field of Search ............................ 296/39.3, 39.1, 296/214, 146.7; 181/284, 286, 294, 296

(56) References Cited

U.S. PATENT DOCUMENTS

| | | | |
|---|---|---|---|
| 5,076,631 A * | 12/1991 | Lord, Jr. ..................... 296/37.8 |
| 5,111,619 A | 5/1992 | Billin et al. .................. 49/502 |
| 5,618,477 A | 4/1997 | Suzuki ....................... 264/46.5 |
| 5,695,865 A | 12/1997 | Shimizu ..................... 428/212 |
| 5,866,232 A | 2/1999 | Gatzmanga ................. 428/122 |
| 5,947,547 A | 9/1999 | Deeks et al. ............. 296/146.7 |
| 6,076,882 A | 6/2000 | Szerdahelyi et al. ..... 296/146.1 |
| 6,119,406 A | 9/2000 | Gulisano et al. ............. 49/502 |
| 6,183,038 B1 | 2/2001 | Hansen et al. ........... 396/146.7 |
| 6,196,607 B1 | 3/2001 | Gulisano ................... 296/39.1 |
| 6,197,403 B1 | 3/2001 | Brown et al. ................ 428/137 |
| 6,210,613 B1 | 4/2001 | Stein et al. ................. 264/45.4 |
| 6,308,488 B1 | 10/2001 | Hoshino ..................... 52/716.5 |
| 6,412,852 B1 | 7/2002 | Koa et al. |
| 6,422,640 B2 | 7/2002 | Whitehead et al. ....... 296/146.7 |
| 6,562,275 B1 | 5/2003 | Martinez .................... 264/308 |
| 6,619,725 B2 | 9/2003 | Gehringhoff et al. |
| 6,656,397 B1 | 12/2003 | Hansen et al. ............. 264/45.4 |
| 6,659,536 B1 | 12/2003 | Chamberlain et al. ... 296/146.5 |
| 6,669,267 B1 | 12/2003 | Lynam et al. ............ 296/146.5 |
| 6,676,195 B1 | 1/2004 | Marriott et al. .......... 296/146.7 |
| 6,767,049 B1 | 7/2004 | Morrison et al. |
| 6,857,688 B2 | 2/2005 | Morrison et al. |
| 2001/0030444 A1 | 10/2001 | Whitehead et al. |
| 2002/0125734 A1 | 9/2002 | Pokorzynski et al. |
| 2003/0001408 A1 | 1/2003 | Hockenberry et al. ... 296/146.7 |

FOREIGN PATENT DOCUMENTS

| | | |
|---|---|---|
| EP | 1215084 A2 | 6/2002 |
| GB | 2287740 A | 9/1995 |

* cited by examiner

Primary Examiner—Joseph D. Pape
(74) Attorney, Agent, or Firm—Wood, Herron & Evans, L.L.P.

(57) ABSTRACT

A vehicle trim panel including a structural frame portion having an inner surface for facing a vehicle body and an outer surface opposite the inner surface and a plurality of flexible projections extending from the inner surface of the structural frame portion and configured to contact the vehicle body to thereby reduce buzz, squeak, and rattle (BSR) between the trim panel and the vehicle body.

17 Claims, 2 Drawing Sheets

VEHICLE TRIM PANEL AND METHOD OF REDUCING BSR

CROSS-REFERENCE

The present invention is related to U.S. Ser. No. 10/708,407, filed Mar. 1, 2004 and U.S. Ser. No. 10/711,119, filed Aug. 25, 2004.

FIELD OF THE INVENTION

The present invention relates generally to trim panels for vehicles and, more particularly, to noises generated by trim panels.

BACKGROUND OF THE INVENTION

Trim panels are typically attached to a vehicle body, such as, for example, to doors, side walls, and exterior panels, to present either an aesthetically pleasing outward appearance to someone viewing the vehicle or an aesthetically pleasing and/or ergonomic inward appearance to someone occupying the passenger compartment or using the vehicle. Trim panels often include a variety of components, each having a specific function. For example, a trim panel may include a structural frame used in attaching the trim panel to a body panel. Further, the structural frame may be attached using U-nut, push-pin, or some other type of fasteners. Moreover, fasteners may be distributed around the periphery or over an inner surface of the structural frame to adequately attach the trim panel to the body panel.

Due to the types of fasteners used, the way the fasteners may be distributed, and the exposure of the attachments to intensive vibration conditions when a vehicle is being operated, trim panels tend to move with respect to body panels generating noise, or what is commonly referred to as buzz, squeak, and rattle (BSR) noises. BSR can occur in vehicles such as automobiles, trucks, and aircraft.

The common practice within the industry to reduce vibration and eliminate associated noise is to place a flat component made of open cell, low compression load deflection (CLD) foam between the trim and body panels. However, such foam is not without drawbacks. For instance, the use of foam increases costs. Foam must also be placed between the trim and body panels in assembly adding another step to the assembly process. In some instances, such as with highly contoured trim panels, larger foam structures must be used to reduce or eliminate BSR further increasing costs and complicating assembly.

Therefore, there exists a need in the art for a vehicle trim panel that effectively reduces BSR between the trim panel and a vehicle body without significantly increased cost or complicated assembly.

SUMMARY OF INVENTION

In accordance with principles of the present invention, a vehicle trim panel includes a structural frame portion having an inner surface for facing a vehicle body and an outer surface opposite the inner surface and a plurality of flexible projections extending from the inner surface of the structural frame portion and configured to contact the vehicle body to thereby reduce BSR between the trim panel and the vehicle body.

In addition, the present invention further contemplates locating or grouping at least a portion of the plurality of flexible projections proximate apertures in the structural frame for receiving fasteners or fasteners that are incorporated into the structural frame. These fastening areas can tend to be the origins of BSR. Therefore, grouping of the flexible projections proximate fastening areas more specifically focuses on the origin of the noise. In a preferred embodiment, the flexible projections are generally cylindrical shaped pins that are rounded at the distal end. Such a shape allows the projections to readily bend between the trim and body panels to thereby reduce BSR between the panels.

Various additional objectives, advantages, and features of the present invention will become more readily apparent to those of ordinary skill in the art from the accompanying drawings and description thereof.

DETAILED DESCRIPTION

Figure 1:
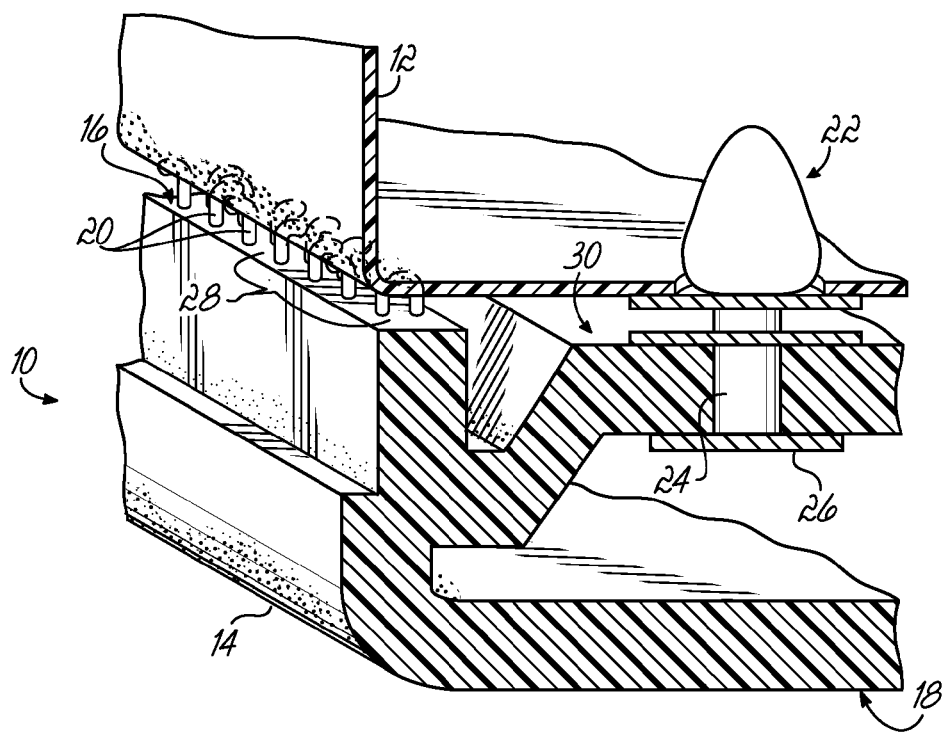
FIG. 1 is a cut away perspective view of an vehicle trim panel fastened to a body panel and constructed in accordance with principles of the present invention.

Referring first to FIG. 1, a vehicle trim panel 10 constructed in accordance with a preferred embodiment of the invention is shown fastened to a vehicle body panel. A vehicle may be, for example, an automobile, a truck, or an aircraft. More specifically, trim panel 10 is shown fastened to the steel sheet metal of door 12 of an automobile. However, those of ordinary skill in the art will appreciate that a trim panel may be used on other body panels such as, for example, hatches, side walls, exterior panels, etc. Further, those of ordinary skill in the art will also appreciate that a vehicle body panel may be constructed of other materials such as, for example, aluminum, or a composite such as fiberglass or carbon fiber.

Trim panel 10 comprises a structural frame portion 14 having an inner surface 16 for facing the sheet metal of door 12 or, more generally, a vehicle body panel or, simply, a vehicle body and an outer surface 18 opposite inner surface 16. Structural frame portion 14 may be molded of polypropylene or acrylonitrile-butadiene-styrene (ABS) or constructed of some other suitable material. As will be appreciated by those of ordinary skill in the art, a covering (not shown), such as vinyl, fabric, leather, or some other desired material, may be placed over outer surface 18 and supported by a foam core (also not shown). In the case of some interior trim panels this will provide an aesthetically pleasing appearance to someone occupying the passenger compartment or using the vehicle. Otherwise, the trim panel itself may provide a visually pleasing appearance, as is the case of trim panels used on the exterior of automobiles.

A plurality of flexible projections 20 extend from inner surface 16 of structural frame portion 14 and are configured to contact door 12, as shown, to thereby reduce buzz, squeak, and rattle (BSR) between trim panel 10 and door 12. In the embodiment shown in FIG. 1, flexible projections 20 are molded onto inner surface 16 of structural frame portion 14. Those of ordinary skill in the art will appreciate that BSR refers not only to buzz, squeak, and rattle noises between a trim panel and a vehicle body but to noise, vibration and hardness (NVH) issues as well. Thus, BSR, as used herein, refers to all noises occurring between a trim panel and a vehicle body. The contacting of the flexible projections 20 will be described in more detail hereinafter.

Generally, trim panel 10 is attached to door 12 using one or more fasteners. Further, fasteners may be distributed around the periphery or over inner surface 16 of structural frame portion 14 to adequately attach trim panel 10 to door 12. More specifically, and as shown in FIG. 1, structural frame portion 14 includes an aperture 24 for receiving a fastener 22. As shown, fastener 22 is a push-pin or "Christmas tree" type fastener. Those of ordinary skill in the art will appreciate that other fasteners may be used in the alternative without departing from the spirit of the present invention. In other embodiments of the present invention, one or more fasteners may be incorporated or molded into structural frame portion 14. For example, and as will be appreciated by those of ordinary skill in the art, were fastener 22 molded onto inner surface 16 of structural frame portion 14, lower portion 26 would be eliminated.

Figure 2:
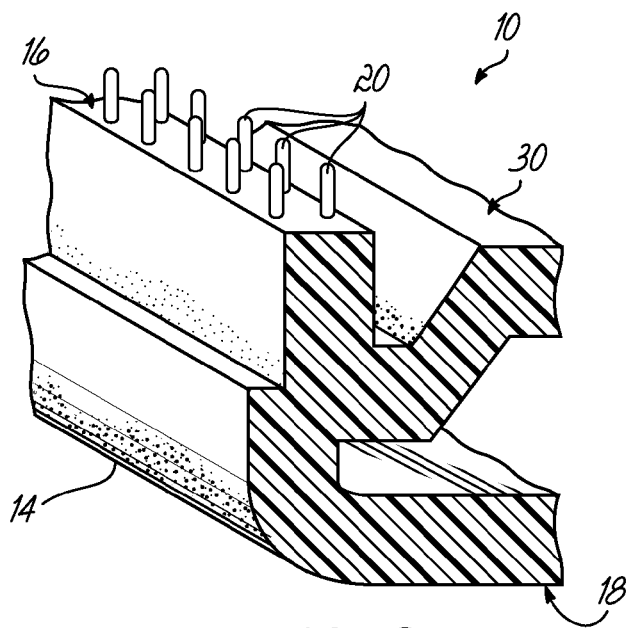
FIG. 2 is an enlarged perspective view, also cut away, of the vehicle trim panel of FIG. 1 prior to being fastened to the body panel.

In accordance with one aspect of the present invention, at least a portion 28 of the plurality of flexible projections 20 are located or grouped proximate aperture 24 or fastener 22. Such grouping of the flexible projections proximate the specific area of the trim panel fasteners or installation surface 30 more specifically focuses on the origin of BSR. FIG. 2, shows an enlarged and fragmented perspective view of trim panel 10 prior to being fastened to door 12. As shown, prior to being fastened to a vehicle body panel, projections 20 extend from inner surface 16 in an upward manner which may be substantially perpendicular to inner surface 16 and/or fastening surface 30.

Referring once again to FIG. 1, when trim panel 10 is fastened to door 12, flexible projections 20 are deformed or are bent between trim panel 10 and door 12 (some or all of certain flexible projections being shown in hidden lines). Further, such deformation of flexible projections 20 causes the projections contacting door 12 to exert a small amount of force between trim panel 10 and door 12 dampening any movements or vibrations there between. The contacting and associated dampening thereby reduces BSR between trim panel 10 and door 12.

Figure 3:
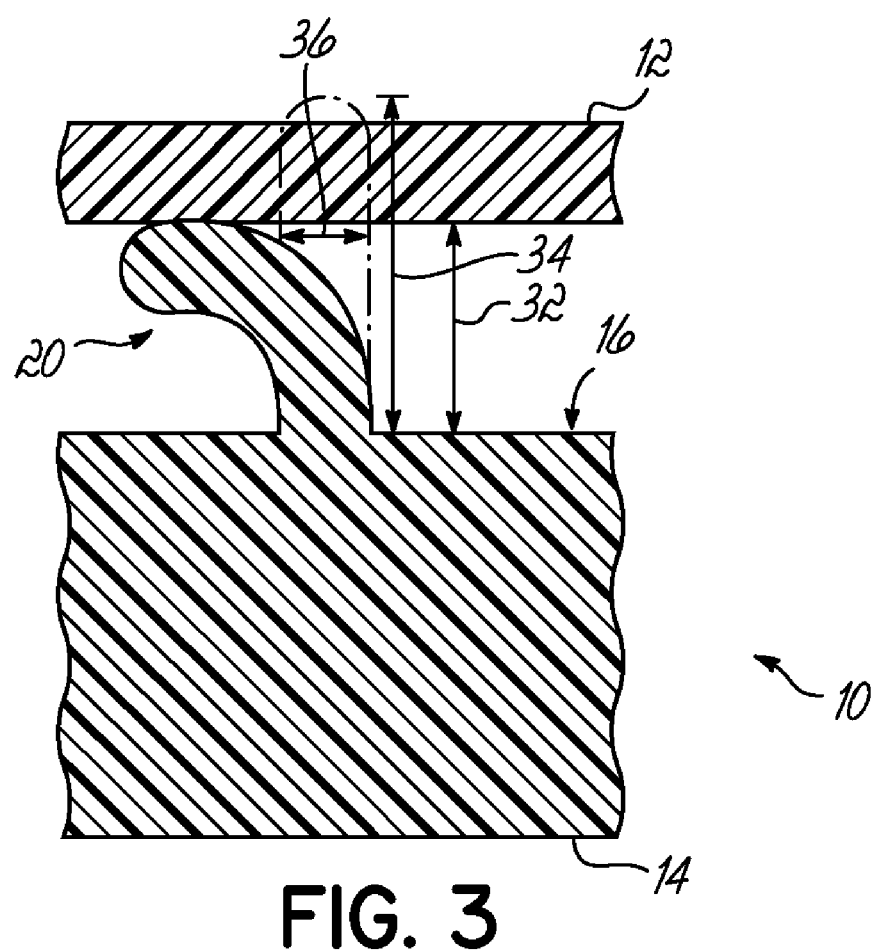
FIG. 3 is enlarged side view of one of the projections in FIGS. 1 and 2.

FIG. 3 shows an enlarged side view of one of the projections in FIGS. 1 and 2. Again, and as shown in FIG. 3, when trim panel 10 is fastened to door 12, flexible projection 20 is deformed or bent between trim panel 10 and door 12. Further, and as shown in phantom line, when trim panel 10 is not fastened to a vehicle body panel, projection 20 extends from inner surface 16 in an upward manner substantially perpendicular to inner surface 16. However, it is not necessary that projections 20 be perpendicularly oriented to operate in accordance with invention.

Generally, when a trim panel 10 is attached to a vehicle body panel, such as door 12, using a U-nut, push-pin, or some other type of common fastener, a small space or gap remains between the trim and body panels proximate the fastener. For example, when a push-pin or "Christmas tree" type fastener 22 is used, a gap of approximately 0.3 to 1.0 millimeters (mm) may be experienced. Such a gap is indicated at reference numeral 32 in FIG. 3 by a double-ended arrow. Thus, in part, gap 32 between trim panel 10 and door 12 determines the length of flexible projections 20. Another consideration in determining the length of flexible projections 20 is ability to remove the flexible projections 20 from a mold without damaging the flexible projections 20 after the flexible projections 20 have been molded onto inner surface 16 of structural frame portion 14. Thus, in the embodiment shown in FIGS. 1–3, flexible projections 20 are approximately 1.0 mm long, the length being indicated at reference numeral 34.

Another consideration with respect to removing the flexible projections 20 from a mold without damaging the flexible projections 20 is the diameter of the flexible projections 20. In FIG. 3, the diameter of flexible projection 20 is indicated at reference numeral 36. Thus, in the embodiment shown in FIGS. 1–3, flexible projections 20 are molded of polypropylene and are approximately 0.8 to 1.0 mm in diameter. However, were the flexible projections 20 molded of some other material, a different range for diameters may be desirable. For example, if the flexible projections 20 are molded of ABS, diameters of 0.3 to 0.5 mm may be used.

While the present invention has been illustrated by a description of a preferred embodiment and while this embodiment has been described in some detail, it is not the intention of the Applicants to restrict or in any way limit the scope of the appended claims to such detail. Additional advantages and modifications other than those specifically mentioned herein will readily appear to those skilled in the art. This has been a description of the present invention, along with the preferred methods of practicing the present invention as currently known. However, the invention itself should only be defined by the appended claims.

Wherein I claim:

1. A vehicle trim panel, comprising:
   a structural frame portion having an inner surface for facing a vehicle body and an outer surface opposite the inner surface; and
   a plurality of flexible projections extending from the inner surface of the structural frame portion and configured to contact the vehicle body to thereby reduce buzz, squeak, and rattle (BSR) between the trim panel and the vehicle body, wherein the width of each projection is approximately 0.3 to 1.0 mm.

2. The trim panel of claim 1, the structural frame portion including an aperture for receiving a fastener and wherein at least a portion of the plurality of flexible projections are located proximate the aperture.

3. The trim panel of claim 1, wherein the structural frame portion and the flexible projections are molded together.

4. The trim panel of claim 3, wherein the structural frame portion and the flexible projections are molded from one of acrylonitrile-butadiene-styrene (ABS) or polypropylene.

5. The trim panel of claim 1, wherein the length of each projection is approximately 1.0 mm.

6. The trim panel of claim 1, wherein the plurality of flexible projections each have a generally cylindrical shape.

7. The trim panel of claim 6, wherein the generally cylindrical shape is generally rounded at a distal end thereof.

8. A vehicle, comprising:
   a body; and
   a trim panel, the trim panel including a structural frame portion having an inner surface facing the body, an outer surface opposite the inner surface and a plurality of flexible projections extending from the inner surface of the structural frame portion along respective axes, the projections contacting the body to deflect the projections away from their respective axes and thereby reduce buzz, squeak and rattle (BSR) between the trim panel and the body.

9. The vehicle of claim 8, the structural frame portion including an aperture for receiving a fastener and wherein at least a portion of the plurality of flexible projections are located proximate the aperture.

10. The vehicle of claim 8, wherein the structural frame portion and the flexible projections are molded together.

11. The vehicle of claim 10, wherein the structural frame portion and the flexible projections are molded from one of acrylonitrile-butadiene-styrene (ABS) or polypropylene.

12. The vehicle of claim 8, wherein the length of each projection is approximately 1.0 mm and the width of each projection is approximately 0.3 to 1.0 mm.

13. The vehicle of claim 8, wherein the plurality of flexible projections each have a generally cylindrical shape.

14. The vehicle of claim 13, wherein the generally cylindrical pin shape is generally rounded at a distal end thereof.

15. A method of reducing buzz, squeak and rattle (BSR) between a trim panel and a vehicle body comprising:
    positioning a plurality of flexible projections between the trim panel and the vehicle body, said projections extending along respective axes; and
    absorbing vibration between the trim panel and the body panel by contacting and deflecting the projections away from their respective axes with the vehicle body.

16. The method of claim 15, further comprising positioning at least a portion of the plurality of flexible projections proximate an aperture in the trim panel for receiving a fastener.

17. The method of claim 15, further comprising positioning at least a portion of the plurality of flexible projections proximate a fastener in the trim panel.

* * * * *